United States Patent
Inagi

(10) Patent No.: US 9,343,754 B2
(45) Date of Patent: May 17, 2016

(54) HIGH PRESSURE GAS SUPPLY SYSTEM AND FUEL CELL SYSTEM

(75) Inventor: Shusuke Inagi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 836 days.

(21) Appl. No.: 13/583,073

(22) PCT Filed: Feb. 23, 2011

(86) PCT No.: PCT/IB2011/000364
§ 371 (c)(1),
(2), (4) Date: Nov. 13, 2012

(87) PCT Pub. No.: WO2011/110911
PCT Pub. Date: Sep. 15, 2011

(65) Prior Publication Data
US 2013/0052553 A1 Feb. 28, 2013

(30) Foreign Application Priority Data
Mar. 9, 2010 (JP) .................................. 2010-051230

(51) Int. Cl.
*H01M 8/04* (2006.01)

(52) U.S. Cl.
CPC ........ *H01M 8/04014* (2013.01); *H01M 8/0432* (2013.01); *H01M 8/04201* (2013.01); *H01M 8/04253* (2013.01); *H01M 8/04731* (2013.01); *H01M 8/04753* (2013.01);
(Continued)

(58) Field of Classification Search
CPC ..................... H01M 8/04014; H01M 8/04201; H01M 8/04253; H01M 8/0432; H01M 8/04373; H01M 8/04731; H01M 8/04753; Y02E 60/50

See application file for complete search history.

(56) References Cited

U.S. PATENT DOCUMENTS 6,815,106 B1 * 11/2004 Salvador ........... H01M 8/04089
429/427
2005/0112424 A1 5/2005 Hirano et al.
(Continued)

FOREIGN PATENT DOCUMENTS

DE   10 2004 055 728   7/2005
DE   11 2006 003 136   10/2008
(Continued)

OTHER PUBLICATIONS

International Search Report in International Application No. PCT/IB2011/000364; Mailing Date: Jul. 13, 2011.
(Continued)

*Primary Examiner* — Raymond Alejandro
(74) *Attorney, Agent, or Firm* — Finnegan, Henderson, Farabow, Garrett & Dunner, LLP

(57) ABSTRACT

A fuel cell system (10) includes a pressure decrease valve (121) and a flow control valve (122) provided in a hydrogen supply line (120P) that extends from a high pressure gas tank (110) to a fuel cell (100). A low temperature environment may cause the function of these devices to decrease. Therefore, if the gas temperature inside the high pressure gas tank (110) is higher than the temperature of this low temperature environment and is a temperature at which the decreased function can be recovered, high pressure gas inside the tank is made to flow through the hydrogen supply line (120P) to expose the pressure decrease valve (121) and the like to the relatively high temperature gas before a start signal that starts the system is received.

9 Claims, 5 Drawing Sheets

(52) U.S. Cl.
CPC .. *F17C 2221/012* (2013.01); *F17C 2270/0178* (2013.01); *F17C 2270/0184* (2013.01); *H01M 8/04373* (2013.01); *Y02E 60/50* (2013.01)

(56) References Cited

U.S. PATENT DOCUMENTS

| | | |
|---|---|---|
| 2006/0096993 A1 | 5/2006 | Takashima |
| 2009/0148728 A1 | 6/2009 | Fujita |

FOREIGN PATENT DOCUMENTS

| | | | |
|---|---|---|---|
| JP | 2000-12062 | | 1/2000 |
| JP | 2005-158426 | | 6/2005 |
| WO | WO 2007/069010 | * | 6/2007 |
| WO | WO 2007/069010 A | | 6/2007 |
| WO | WO 2009/071169 A1 | | 6/2009 |

OTHER PUBLICATIONS

Written Opinion of the International Searching Authority International Application No. PCT/IB2011/000364; Mailing Date: Jul. 13, 2011.

Applicant's Response International Application No. PCT/IB2011/000364 (Dec. 28, 2011).

* cited by examiner

HIGH PRESSURE GAS SUPPLY SYSTEM AND FUEL CELL SYSTEM

CROSS-REFERENCE TO RELATED APPLICATIONS

This application is a national phase application of International Application No. PCT/IB2011/000364, filed Feb. 23, 2011, and claims the priority of Japanese Application No. 2010-051230, filed Mar. 9, 2010, the content of both of which is incorporated herein by reference.

BACKGROUND OF THE INVENTION

1. Field of the Invention

The invention relates to a high pressure gas supply system that supplies high pressure gas to a gas consuming apparatus, and a fuel cell system provided with this high pressure gas supply system.

2. Description of the Related Art

In recent years, vehicles driven by combustion energy of fuel gas and electric energy generated by an electrochemical reaction of fuel gas have been developed. Fuel gas such as natural gas and hydrogen is stored in high pressure gas tanks provided in these vehicles. Also, stationary fuel cell systems provided with fuel cells that induce an electrochemical reaction of fuel gas as a power source for generating electricity are also becoming more prevalent.

Because stationary fuel cell systems or fuel cell systems for vehicles may be started in a low temperature environment, Japanese Patent Application Publication No. 2005-158426 (JP-A-2005-158426), for example, proposes technology that attempts to prevent moisture from freezing.

While JP-A-2005-158426 attempts to prevent moisture in a hydrogen pump in a line from freezing by driving the pump when the system stops in order to remove water in the pump, presently little is done for a pressure decrease valve (i.e., a pressure regulating valve) disposed in a hydrogen gas line. For example, a pressure decrease valve uses a rubber diaphragm, and the rubber hardness of this rubber diaphragm naturally increases in a low temperature environment, so there is a possibility that the responsiveness of the diaphragm will decrease. Reduced responsiveness of the diaphragm affects the stability of the regulated pressure, which leads to a decrease in the pressure regulating function. With the technology proposed in JP-A-2005-158426, it is necessary to continuously operate a hydrogen pump that provides gas ventilation with adiabatic compression in order to avoid this decrease in function, so an improvement is now needed. Incidentally, this problem is not limited to a pressure decrease valve. That is, a similar problem also occurs when an apparatus that may suffer a decrease in function due to a decrease in temperature is disposed in a hydrogen gas line.

SUMMARY OF INVENTION

This invention improves stable operation from the beginning of startup in a low temperature environment.

A first aspect of the invention relates to a high pressure gas supply system that includes a high pressure gas tank in which high pressure gas is stored; a gas supply line that extends from the high pressure gas tank to a gas consuming apparatus; a gas supply portion that supplies the high pressure gas inside the high pressure gas tank to the gas supply line upon receiving a start signal to start the system so that the gas consuming apparatus starts consuming gas; a gas supply functional portion that is arranged in the gas supply line downstream of the gas supply portion and functions to make an amount of gas that passes through the gas supply line to be consumed by the gas consuming apparatus appropriate; and a preliminary control portion that performs preliminary control that drives the gas supply portion before the start signal is received, according to a gas temperature inside the high pressure gas tank and an ambient temperature of the gas supply line.

In this aspect, in a low temperature environment that may cause a decrease in function of the gas supply functional portion arranged in the gas supply line, there is a possibility that the function of the gas supply functional portion may decrease. However, with the high pressure gas supply system having the structure described above, the gas supply portion is driven by the preliminary control portion to send high pressure gas from the high pressure gas tank through the gas supply line before a start signal to start the system is received. Therefore, in a low temperature environment in which the ambient temperature is low, the gas supply functional portion is exposed to the gas in the high pressure gas tank that is at a higher temperature than the ambient temperature of the gas supply line, and thus rises in temperature, before the start signal to start the system is issued. Therefore, even if the function of the gas supply functional portion has decreased, that function is able to be recovered. As a result, according to the high pressure gas supply system having the structure described above, the function of the gas supply functional portion is able to be maintained or ensured before the system is started, so stable operation is possible from the very beginning of startup in a low temperature environment. Moreover, when improving this stability, it is sufficient to only supply gas from the high pressure gas tank, so there is no need for special equipment. Accordingly, the structure can be simplified, and cost and weight can be reduced.

In the aspect described above, the preliminary control portion may perform the preliminary control when the ambient temperature is a temperature in a low temperature environment that causes a decrease in function of the gas supply functional portion, and the gas temperature inside the high pressure gas tank is higher than the ambient temperature and is a temperature at which the decreased function of the gas supply functional portion is able to be recovered. According to this structure, the function of the gas supply functional portion can be even more reliably maintained or ensured before the system is started when the system is started in a low temperature environment, so stable operation is possible from the very beginning of startup in a low temperature environment.

In the structure described above, the preliminary control portion may perform the preliminary control in conjunction with the completion of filling gas into the high pressure gas tank. When gas is filled into the high pressure gas tank, the temperature of the gas in the tank naturally rises as the high pressure gas is filled. When filling the high pressure gas tank with gas, the temperature of the gas inside the tank naturally rises as high pressure gas is filled. As a result, two things happen (i.e., two conditions develop). The first is that the temperature of the gas in the high pressure gas tank becomes higher than the ambient temperature in a low temperature environment that may cause a decrease in function of the gas supply functional portion. The second is that the temperature of the gas inside the high pressure gas tank rises to a temperature at which the function of the gas supply functional portion that has decreased is able to recover. Therefore, the operating state during startup in a low temperature environment can be effectively stabilized early on. In this case, the gas supply portion that is driven in conjunction with the completion of filling gas into the high pressure gas tank is not only able to be driven after filling is complete, but before filling is complete as well, due to the fact that the two conditions are able to develop before filling is complete as well.

Also, the preliminary control portion may perform the preliminary control with a smaller amount of supplied gas than an amount of supplied gas that the gas supply portion sends through the gas supply line upon receiving the start signal.

In the high pressure gas supply system described above, a plurality of the gas supply functional portion may be provided, the high pressure gas supply system described above may also include a gas circulating portion that circulates gas that has reached a gas supply functional portion farthest downstream, from among the plurality of gas supply functional portions arranged in the gas supply line, without supplying the gas to the gas consuming apparatus during the preliminary control.

A second aspect of the invention relates to a fuel cell system that includes a fuel cell and the high pressure gas supply system according to any one of structures described above. Here, the gas consuming apparatus provided in the high pressure gas supply system is a fuel cell, and the high pressure gas tank provided in the high pressure gas supply system is a tank in which fuel gas that is supplied for an electrochemical reaction in the fuel cell is stored.

According to this aspect, when starting to generate power in a fuel cell in a low temperature environment, the function of the gas supply functional portion can be maintained or ensured before power starts to be generated, so stable operation is possible from the very beginning of fuel cell startup in a low temperature environment.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiments of the present invention will be described in greater detail below with reference to the accompanying drawings.

Figure 1:
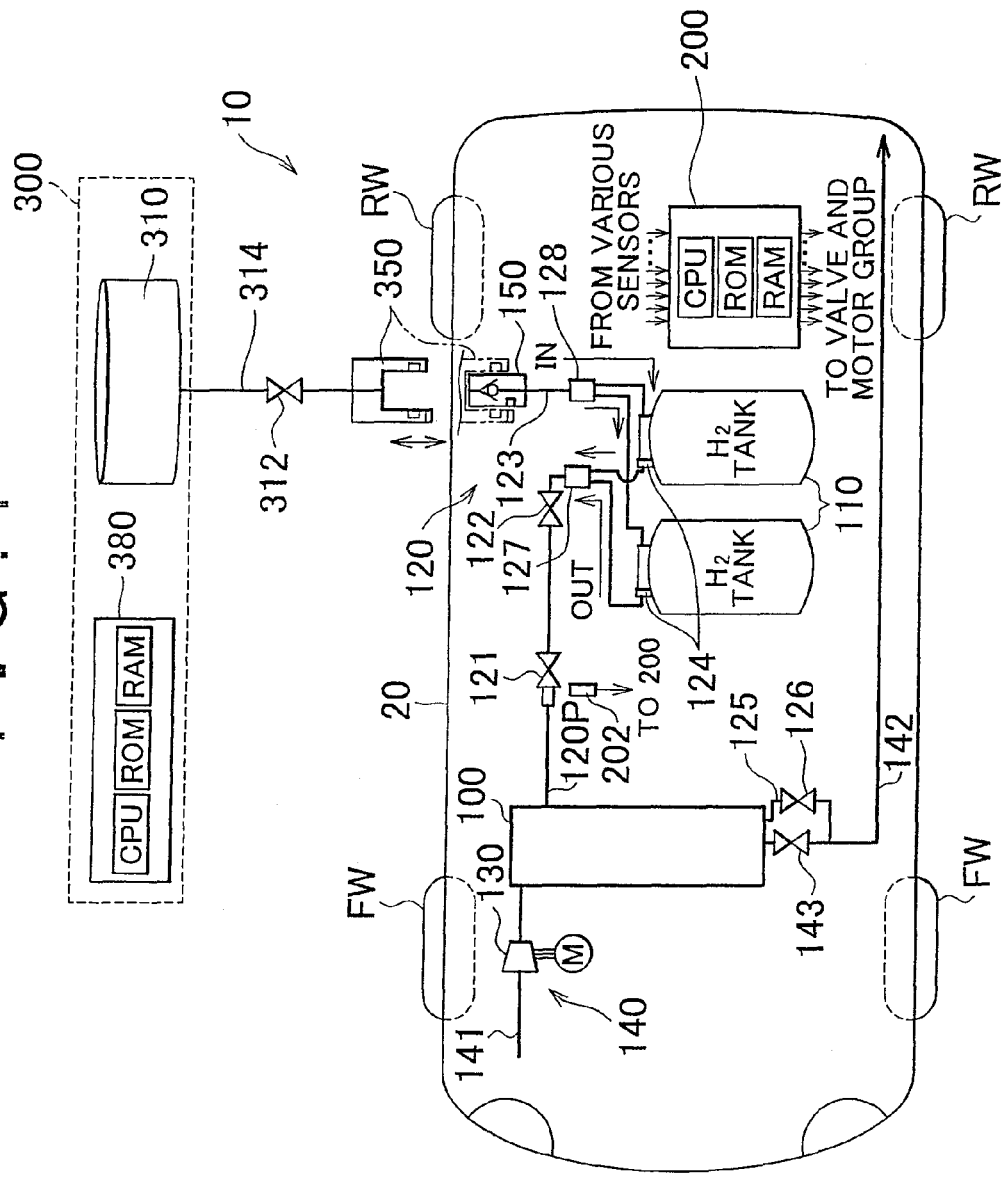
FIG. 1 is a view schematically showing a fuel cell system as an example embodiment of the invention.

As shown in FIG. 1, this fuel cell system 10 includes a fuel cell 100, a hydrogen gas supply system 120 that includes two high pressure gas tanks 110, an air supply system 140 that includes a motor-driven compressor 130, a cooling system, not shown, and a control apparatus 200, all provided in a fuel cell vehicle 20. The fuel cell 100 is formed by a stack of power generating modules, each including a membrane electrode assembly (MEA), not shown, in which an anode is joined to one side of an electrolyte membrane and a cathode is joined to the other side of the electrolyte membrane. The fuel cell 100 is positioned under the floor of the vehicle between front wheels FW and rear wheels RW. This fuel cell 100 generates power by inducing an electrochemical reaction between hydrogen in hydrogen gas supplied from the hydrogen gas supply system 120 that will be described later, and oxygen in the air supplied from the air supply system 140. The generated power is used to drive a load such as a motor, not shown, for driving the front and rear wheels. The high pressure gas tanks 110 are filled, i.e., supplied, with high pressure hydrogen gas from a hydrogen gas station 300. The manner in which the high pressure gas tanks 110 are filled, i.e., the manner of filling, will be described later. The high pressure gas tanks 110 have a fiber-reinforced layer in which fiber containing thermosetting resin is wound around the outer periphery of a resin liner. As a result, heat does not dissipate as well as it does with a metal tank, so the temperature of the gas inside the tank does not decrease as easily.

The hydrogen gas supply system 120 includes a hydrogen supply line 120P that extends from each of the high pressure gas tanks 110 to the fuel cell 100, a pressure decrease valve 121 provided in the hydrogen supply line 120P right before the fuel cell 100, a flow control valve 122 provided in the hydrogen supply line 120P, a filling line 123 used for filling that extends from each of the high pressure gas tanks 110, a cap valve 124 that is arranged at the mouth of each high pressure gas tank 110 and opens and closes the filling line 123, a discharge line 125 that discharges unconsumed hydrogen gas (i.e., anode off gas) into the atmosphere, and an outflow control valve 126 provided in the discharge line 125. In this hydrogen gas supply system 120, a gas supply line (i.e., an OUT line) that extends from each tank is connected to an OUT-side manifold 127 in the hydrogen supply line 120P, and a filling line (i.e., an IN line) extends to each tank from an IN-side manifold 128 in the filling line 123.

The hydrogen gas supply system 120 having the line configuration described above discharges cathode off gas into the atmosphere from a discharge line 142 that will be described later at a flowrate regulated by the outflow control valve 126 in the discharge line 125, while supplying hydrogen gas from the high pressure gas tank 110 selected as the supply tank by the OUT-side manifold 127 to the anode of the fuel cell 100 after first regulating the flowrate of the gas with the flow control valve 122 in the hydrogen supply line 120P and decreasing the pressure of the gas with the pressure decrease valve 121 in the hydrogen supply line 120P. When supplying the hydrogen gas as described above, in this example embodiment, the cap valve 124 of the high pressure gas tank 110 selected as the supply tank by the OUT-side manifold 127 opens that line, and the flowrate of the gas is regulated by the flow control valve 122 and the pressure of the gas is reduced (i.e., regulated) by the pressure decrease valve 121, both of which are described above. The flow control valve 122 is able to regulate the gas flowrate from a zero flowrate, and closes off the hydrogen supply line 120P by making the flowrate zero.

Also, the hydrogen gas supply system 120 includes a receptacle 150 for high pressure hydrogen gas filling (also referred to simply as "filling" in this specification). This receptacle 150 is provided at a tip end of the filling line 123 that extends from the high pressure gas tanks 110 to be filled with high pressure hydrogen gas, and is positioned in a filling location on the side of the vehicle. This filling location corresponds to a location where fuel is supplied in an existing gasoline vehicle. The provided receptacle 150 is covered by a vehicle outer cover.

The air supply system 140 includes an oxygen supply line 141 that leads to the fuel cell 100 via the compressor 130, a discharge line 142 through which unconsumed air (i.e., cathode off gas) is discharged into the atmosphere, and an outflow control valve 143 disposed in the discharge line 142. The air supply system 140 discharges cathode off gas through the discharge line 142 at a flowrate regulated by the outflow control valve 143 in the discharge line 142, while supplying air drawn in from an open end of the oxygen supply line 141 to the cathode of the fuel cell 100 after the flowrate of the air has been regulated by the compressor 130.

The control apparatus 200 is formed by a so-called microcomputer that includes a CPU that executes logic operations, ROM, and RAM, and the like, and is responsible for various controls of the fuel cell 100, including valve control, in response to received sensor input from an accelerator or the like, sensor input according to a filling operation, and sensor input from a temperature sensor. A temperature sensor 202 detects an outside air temperature around the area where the pressure decrease valve 121 is located, or the line surface temperature of the hydrogen supply line 120P, and outputs the detected temperature to the control apparatus 200.

The hydrogen gas station 300 includes a gas storage tank 310 that stores hydrogen gas under high pressure, a station-side line 314 that has an on-off valve 312 arranged therein, a nozzle 350 located at the tip end of the station-side line 314, and a filling control device 380. The nozzle 350 opens the line with the receptacle 150 by being inserted into the receptacle 150 on the side of the fuel cell vehicle 20, and closes the line by being removed from the receptacle 150. To facilitate filling using the nozzle 350, the station-side line 314 is a high-pressure resistant flexible hose on the side with the nozzle 350 and thus conforms to the insertion/removal of the nozzle 350 into/from the receptacle 150. The filling control device 380 is formed by a so-called microcomputer that includes a CPU that executes logic operations, ROM, and RAM and the like, and is responsible for control related to filling, including valve control, in response to received sensor input according to operation of the nozzle 350 to perform filling or stop filling. Incidentally, the receptacle 150 and the nozzle 350 are configured to be able to send and receive data. A filling start signal and a filling complete signal and the like are output to the control apparatus 200 of the fuel cell vehicle 20 from the side with the filling control device 380.

This hydrogen gas station 300 provides high pressure hydrogen gas to be filled into the high pressure gas tanks 110 of the fuel cell vehicle 20 and thus corresponds to a gasoline service station for existing gasoline vehicles. If the high pressure gas tanks 110 and the fuel cell 100 were stationary types and arranged in a house, a store, or a plant, for example, the hydrogen gas station 300 would be in the form of a gas delivery system arranged in a vehicle such as a truck.

Figure 2:
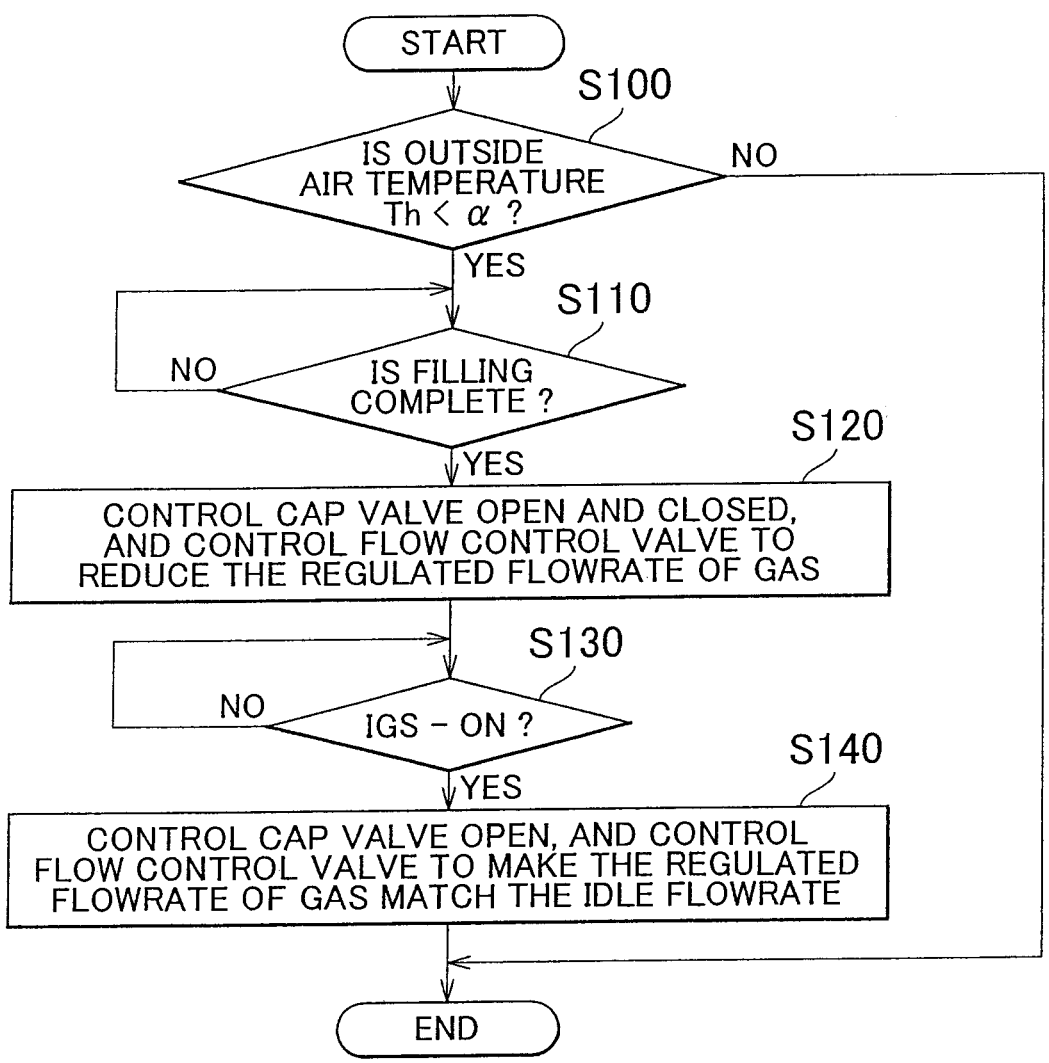
FIG. 2 is a flowchart illustrating the steps in a function recovery routine at startup according to a first example embodiment of the invention.

Next, a function recovery routine at startup in a low temperature environment performed for the pressure decrease valve 121 and the flow control valve 122 and the like arranged in the hydrogen supply line 120P will be described. Incidentally, the preliminary control of the invention may be regarded as the function recovery routine. The pressure decrease valve 121 houses a rubber diaphragm for regulating pressure. The flow control valve 122 uses a rubber seal member as a constituent member for regulating the flowrate. Therefore, unless gas is supplied when the outside air temperature or the line temperature of the hydrogen supply line 120P is below zero, for example, the rubber hardness will increase, so there is a possibility of reduced responsiveness for regulating pressure or of insufficient sealing. In order to avoid this, the fuel cell system 10 of this example embodiment executes a function recovery routine in a low temperature environment as described below. The function recovery routine at startup shown in FIG. 2 is repeatedly executed at predetermined units of time while operation of the fuel cell 100 in the fuel cell vehicle 20 is stopped, presuming that the high pressure gas tanks 110 are being filled with gas. Normal fuel cell operation control (not shown) based on the accelerator operation amount is resumed when the fuel cell 100 starts to be operated.

The function recovery routine that is illustrated is scheduled to be executed when the high pressure gas tanks 110 are being filled with gas. First, it is determined whether the outside air temperature Th is less than a predetermined temperature α, based on the detection value of the temperature sensor 202 (step S100). In this example embodiment, this predetermined temperature α is zero degrees Celsius, as the temperature that may lead to a decrease in the function of the rubber diaphragm of the pressure decrease valve 121. In this case, the predetermined temperature α may also be a temperature other than zero degrees depending on the characteristic of the rubber used for the diaphragm. Also, the outside air temperature Th may be regarded as the ambient temperature in the invention.

If the determination in step S100 is no, then the outside air temperature Th is not low enough to cause a decrease in the function of the pressure decrease valve 121, so this cycle of the routine ends without any other steps being performed. If, on the other hand, the determination in step S100 is yes, then it is determined whether filling is complete (step S110). This step is repeated until filling is complete. Here, filling the high pressure gas tanks 110 with gas will be briefly described.

When filling the high pressure gas tanks 110 with gas from the hydrogen gas station 300, the nozzle 350 of the hydrogen gas station 300 is inserted into the receptacle 150 of the fuel cell vehicle 20. A sensor signal that accompanies this insertion of the nozzle 350 into the receptacle 150 is output to the control apparatus 200 of the fuel cell vehicle 20 and the filling control device 380 of the hydrogen gas station 300, so it is clear that filling has started upon insertion of the nozzle 350 into the receptacle 150.

During filling, the control apparatus 200 of the fuel cell vehicle 20 closes off the hydrogen supply line 120P in FIG. 1 by setting the flow control valve 122 in the hydrogen supply line 120P to have a zero flowrate in order to stop operation of the fuel cell 100, and opens the cap valve 124 located right before the high pressure gas tank 110. In this state, high pressure hydrogen gas is filled from the filling line 123 into the high pressure gas tank 110. In this case, the high pressure gas tank 110 that is filled is selected by the IN-side manifold 128.

The filling control device 380 monitors shifts in the gas flowrate and the pressure from a gas flow meter, not shown, and a pressure gauge of the station-side line 314, and ascertains the filling status into the high pressure gas tank 110 from be start of filling. Then when the filling of gas into the high pressure gas tank 110 is complete, a filling complete signal is output to the control apparatus 200. Upon receiving this signal, the control apparatus 200 ascertains the filling status and detects that filling is complete or near completion according to the time elapsed after the start of filling and the shift in pressure inside the tank. Incidentally, once filling is complete, the nozzle 350 is removed from the receptacle 150 and the control apparatus 200 controls the IN-side manifold 128 to close the filling line 123.

If after the determination in step S100 is yes (i.e., the outside air temperature Th<α (0° C.)) the determination in step S110 is also yes, then the filling of gas into the high pressure gas tank 110 is complete or close to being complete, so the gas temperature inside the tank will naturally rise as the high pressure gas (i.e., the high pressure hydrogen gas) is filled into the tank. When hydrogen gas is filled at a pressure of approximately 70 MPa, it is estimated that the gas inside the tank will rise to a temperature of approximately 85° C. Therefore, when the determination in step S110 is yes, it is determined that the temperature of the gas inside the high pressure gas tank 110 is higher than the outside air temperature Th (<α (0° C.)) that may cause a decrease in the function of the pressure decrease valve 121, and the temperature of the pressure decrease valve 121 can be increased, such that the function of the pressure decrease valve 121 can be recovered, by exposing the pressure decrease valve 121 to the gas of this temperature, so the process proceeds on to step S120. In step S120, the cap valve 124 of the high pressure gas tank 110 is controlled open and closed over a short period of time (for example, is controlled open and closed two to three times over several seconds), and the flow control valve 122 is adjusted (i.e., controlled) such that the regulated flowrate of gas decreases. The regulated flowrate of gas in this case need only be such that the high temperature gas that flows out of the tank reaches the pressure decrease valve 121 and raises the temperature of the diaphragm of the pressure decrease valve 121 and the line. Therefore, the regulated flow of gas may be approximately a fraction of the idle flowrate when the fuel cell vehicle 20 is idling.

After step S120, it is determined whether an ignition switch (hereinafter referred to as "IGS") of the fuel cell vehicle 20 has been turned on, and consequently, the fuel cell 100 has been started (step S130). This step is repeated until the system is started by the IGS operation. When a system start signal is output in response to an ON operation of the IGS, the cap valve 124 is controlled open in a steady state, and the flow control valve 122 is controlled (i.e. adjusted) such that the regulated flowrate of the gas flowing through the flow control valve 122 comes to match the idle flowrate (step S140). After this, operation control of the fuel cell 100 shifts to operation control based on an accelerator operation by the driver, and the function recovery routine at startup ends.

As described above, with the fuel cell system 10 of this example embodiment, even if the function of the rubber diaphragm and the valve seal member of the pressure decrease valve 121 and the flow control valve 122 arranged in the hydrogen supply line 120P decreases due to a low temperature environment, the cap valve 124 of each tank is driven open before the IGS is turned on, such that high pressure hydrogen gas in the high pressure gas tank 110 flows through the hydrogen supply line 120P (step S120) in conjunction with the completion of filling gas into the high pressure gas tank 110 (step S110). Accordingly, the high pressure hydrogen gas that flows through the hydrogen supply line 120P is naturally at a high temperature when the high pressure gas tank 110 is being filled, so the gas temperature is a temperature that is higher than the outside air temperature Th that may cause the function to decrease as described above, and thus enables the decreased function to recover. Therefore, the pressure decrease valve 121 and the flow control valve 122 are exposed to the high temperature gas (i.e., the hydrogen gas) as described above and thus rise in temperature before the start signal is issued from the IGS when operating the fuel cell vehicle 20 in a low temperature environment. This increased temperature enables the decreased function to recover. As a result, according to the fuel cell system 10 of this example embodiment, when the system is started in a low temperature environment, the function of valve devices, such as the pressure decrease valve 121 and the flow control valve 122, can be maintained or ensured before the system is started, so stable operation is possible from the very beginning of startup in a low temperature environment. Moreover, when improving this stability, it is sufficient to only supply gas from the high pressure gas tanks 110 that are already mounted in the fuel cell vehicle 20, which obviates the need for special equipment to recover the function. Accordingly, with the fuel cell system 10 of this example embodiment, the structure can be simplified, and cost and weight can be reduced, when stabilizing operation in a low temperature environment.

Also, with the fuel cell system 10 of this example embodiment, gas inside that tank that naturally rises in temperature when gas is filled into the high pressure gas tank 110 is used for function recovery, so a structure for increasing the temperature of the gas is not necessary. As a result, the structure can be simplified, and cost and weight can be effectively reduced.

Also, with the fuel cell system 10 of this example embodiment, when recovering the function of the pressure decrease valve 121 and the like before the IGS is turned on, the regulated flowrate of the gas by the flow control valve 122 is made less than the idle flowrate when the fuel cell vehicle 20 is idling. Therefore, function of the pressure decrease valve 121 and the like can be recovered with a small amount of gas before the fuel cell vehicle 20 is operated, or more specifically, before the fuel cell vehicle 20 idles. Incidentally, the function recovery routine may be performed after completion of filling the high pressure gas tank, or in conjunction with the completion of filling the high pressure gas tank.

Figure 3:
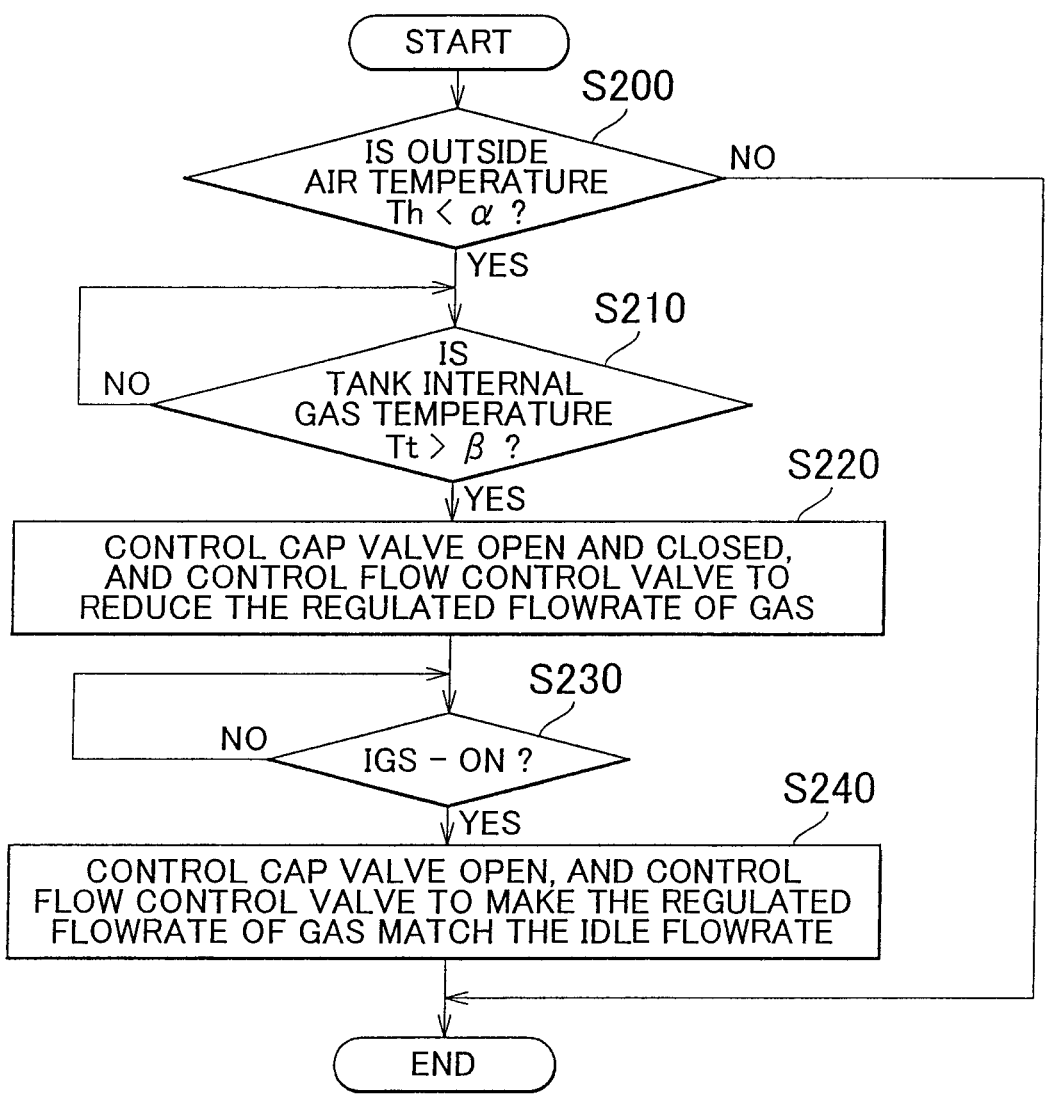
FIG. 3 is a flowchart illustrating a function recovery routine at startup according to a second example embodiment of the invention.

Next, a second example embodiment of the invention will be described. FIG. 3 is a flowchart illustrating a function recovery routine at startup according to the second example embodiment. This example embodiment takes even greater advantage of the fact that the high pressure gas tanks 110 have a fiber-reinforced layer in which fiber containing thermosetting resin is wound around the outer periphery of a resin liner, which makes it difficult for the temperature of the gas inside the tanks to decrease.

In the function recovery routine at startup in FIG. 3, it is first determined whether the outside air temperature Th is less than a predetermined temperature α, based on the detection value of the temperature sensor 202 (step S200), as described above. If the outside air temperature Th is less than the predetermined temperature α, it is then determined whether the tank internal gas temperature (i.e., the temperature of the gas inside the tank) Tt is higher than a predetermined temperature β (step S210), based on a detection value from a tank internal temperature sensor that has already been arranged in the high pressure gas tank 110. This predetermined temperature β is set to a temperature that is higher than the predetermined temperature α described above that may cause a decrease in function of the pressure decrease valve 121, and is a predetermined temperature (such as approximately 50° C.) at which the function of the pressure decrease valve 121 can be recovered if the tank internal gas temperature Tt is higher than the predetermined temperature β, by exposing the pressure decrease valve 121 to the gas of that tank internal gas temperature Tt, thereby raising the temperature of the pressure decrease valve 121. Once the determine in step S210 is yes, control to open and close the cap valve 124 over a short period of time and control to reduce the flowrate at the flow control valve 122 are performed (step S220), after which control waits for the IGS to be turned on (step S230), and when the IGS is turned on, steady-state control of the cap valve 124 and idle flowrate control of the flow control valve 122 are performed (step S240), similar to steps S120 to S140 described above. After this, operation control of the fuel cell 100 shifts to operation control based on an accelerator operation by the driver, and the function recovery routine at startup ends.

In this example embodiment as well, the effects described above can be achieved by supplying high temperature gas in the high pressure gas tanks 110. Incidentally, the structure may also be such that if the determination in step S210 is no, the driver of the fuel cell vehicle 20 is notified and urged to idle longer than normal after turning on the IGS due to the possibility of a decrease in function, or is first notified that there is a possibility of a decrease in function and then idling is continued for a predetermined period of time after the IGS has been turned on.

Figure 4:
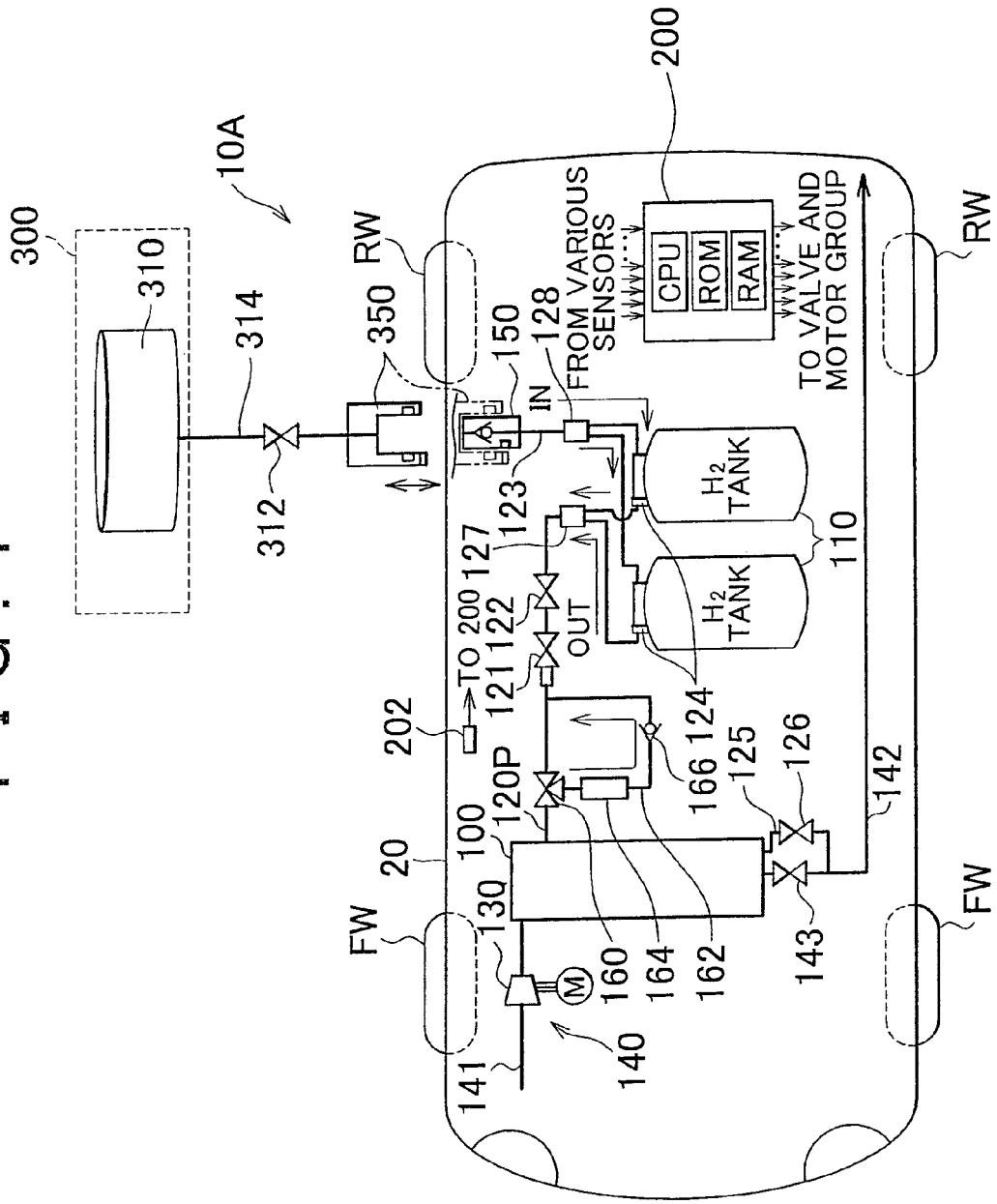
FIG. 4 is a view schematically showing a fuel cell system as a third example embodiment of the invention.

Next, a third example embodiment of the invention will be described. FIG. 4 is a view schematically showing a fuel cell system 10A according to the third example embodiment.

With the fuel cell system 10A of this example embodiment, gas (i.e., hydrogen gas) that is supplied to recover the function of the pressure decrease valve 121 and the like does not flow into the fuel cell 100 due to the provision of a three-way valve 160 downstream of the pressure decrease valve 121, a circulation line 162 from this three-way valve 160, a buffer 164, and a check valve 166, as shown in the drawing. The three-way valve 160 connects the hydrogen supply line 120P to the fuel cell 100 when the IGS is on, and connects the hydrogen supply line 120P to the circulation line 162 when the IGS is off. The circulation line 162 circulates gas to the hydrogen supply line 120P downstream of the pressure decrease valve 121. The buffer 164 is designed to increase the volume of the circulation line 162, and temporarily stores gas that flows through the circulation line 162. The check valve 166 allows gas to pass through the circulation line 162 only from the side on which the three-way valve 160 is located.

With the fuel cell system 10A of the structure described above, gas (i.e., hydrogen gas) supplied to recover the function of the pressure decrease valve 121 and the like is able to be prevented from flowing to the fuel cell 100 by being circulated by the branch at the three-way valve 160 and the circulation line 162, and temporarily stored in the buffer 164. Therefore, according to the fuel cell system 10A, fuel gas (i.e., hydrogen gas) is able to be prevented from being supplied to the fuel cell 100 before the IGS is turned on.

While the invention has been described with reference to example embodiments thereof, it should be understood that the invention is not limited to the example embodiments. That is, the invention may be carried out in modes that have been modified in any of a variety of ways without departing from the scope thereof. For example, in the example embodiments described above, the fuel cell system 10 having the fuel cell 100 that serves as a gas consuming apparatus is described. However, the invention may also be applied to a system having an engine that burns natural gas (CNG) and converts that combustion energy into driving force.

Figure 5:
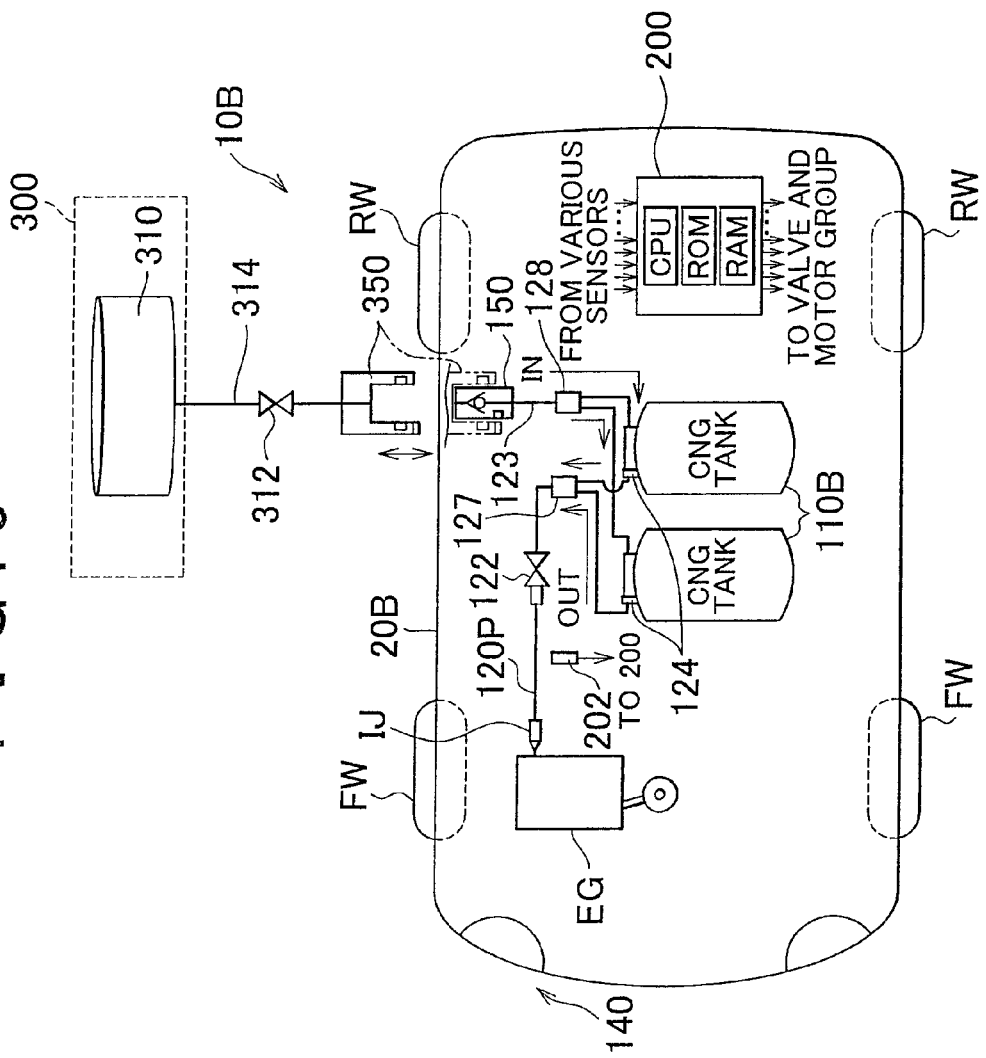
FIG. 5 is a view schematically showing a fuel cell system provided with a natural gas engine.

FIG. 5 is a schematic diagram of a fuel cell system 10B provided with a natural gas engine EG. As shown in the drawing, this fuel cell system 10B includes an injector IJ at the downstream-most end of the hydrogen supply line 120P, and produces power for driving a vehicle 20B by combusting natural gas injected by the injector IJ in a combustion chamber of the natural gas engine EG. With the fuel cell system 10B according to this modified example shown in FIG. 5 as well, the seal function of the injector IJ that incorporates a rubber seal can be maintained or ensured before the system even begins to be started, so natural gas can be stably injected from the very beginning of system startup. Incidentally, the invention may of course also be applied to a vehicle provided with an engine that burns hydrogen gas.

In addition, in the example embodiments described above, the fuel cell system 10 for the fuel cell vehicle 20 is described as an example, but the invention may also be applied to a stationary fuel cell system for obtaining generated power.

The invention claimed is:

1. A pressurized gas supply system comprising:
a pressurized gas tank in which pressurized gas is stored;
a gas supply line that extends from the pressurized gas tank to a gas consuming apparatus;
a valve acting as a gas supply portion that supplies the pressurized gas inside the pressurized gas tank to the gas supply line upon receiving a start signal to start the system so that the gas consuming apparatus starts consuming gas;
a gas supply functional portion that includes at least one of a pressure decrease valve and a flow control valve, the gas supply functional portion being arranged in the gas supply line downstream of the gas supply portion and functions to regulate an amount of gas that passes through the gas supply line to be consumed by the gas consuming apparatus; and
a control apparatus that is configured to perform, when an ambient temperature is less than a predetermined temperature and a gas temperature inside the pressurized gas tank is higher than the ambient temperature, a preliminary control that drives the gas supply portion before the start signal is received,
wherein the ambient temperature is a temperature in a low temperature environment that causes a decrease in function of the gas supply functional portion, and the gas temperature inside the pressurized gas tank, that is higher than the ambient temperature, is a temperature at which the decrease in the function of the gas supply functional portion is recovered.

2. The pressurized gas supply system according to claim 1, wherein the control apparatus performs the preliminary control after completion of filling gas into the pressurized gas tank.

3. The pressurized gas supply system according to claim 1, wherein the pressurized gas tank has a fiber-reinforced layer in which fiber containing thermosetting resin is wound around an outer periphery of a resin liner.

4. The pressurized gas supply system according to claim 1, wherein the control apparatus performs the preliminary control in conjunction with the completion of filling gas into the pressurized gas tank.

5. The pressurized gas supply system according to claim 1, wherein the control apparatus performs the preliminary control with a first amount of supplied gas that is smaller than a second amount of supplied gas that the gas supply portion sends through the gas supply line upon receiving the start signal.

6. The pressurized gas supply system according to claim 1, further comprising a gas circulating portion that circulates gas that has reached the gas supply functional portion, without supplying the gas to the gas consuming apparatus during the preliminary control.

7. The pressurized gas supply system according to claim 1, wherein a plurality of the gas supply functional portion is provided,
the pressurized gas supply system further comprising a gas circulating portion that circulates gas that has reached a gas supply functional portion farthest downstream, from among the plurality of gas supply functional portions arranged in the gas supply line, without supplying the gas to the gas consuming apparatus during the preliminary control.

8. The pressurized gas supply system according to claim 1, further comprising a gas circulating portion that includes a circulation line and a three-way valve that connects the circulation line to the gas supply line during the preliminary control.

9. A fuel cell system comprising:
   a fuel cell; and
   the pressurized gas supply system according to claim 1,
   wherein the gas consuming apparatus provided in the pressurized gas supply system is the fuel cell; and
   the pressurized gas tank provided in the pressurized gas supply system is a tank in which fuel gas that is supplied for an electrochemical reaction in the fuel cell is stored.

* * * * *